Patented Dec. 8, 1931

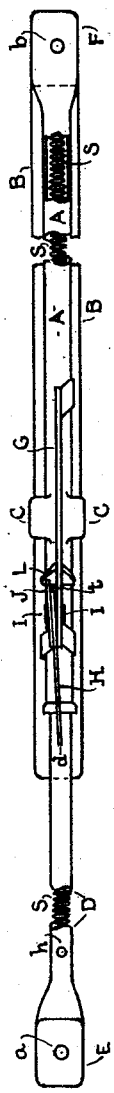

1,834,967

UNITED STATES PATENT OFFICE

MAX EMIL PODGORSKI AND LOUISE M. SOLDEN, OF MILWAUKEE, WISCONSIN

DEVICE FOR EXTENDING ADJUSTABLE WINDOW SCREENS

Application filed August 17, 1931. Serial No. 557,708.

Our invention relates to improvements in a mechanism for extending adjustable window screens of which the following description, taken in connection with the accompanying drawings is a full, clear and exact description. The objects of the invention are to provide a device by means of which the members of the adjustable screen may be moved toward each other and secured in juxtaposition, when such screen may be placed in a window frame, whereupon, by finger pressure upon a trigger, the operative parts of the mechanism cause the slidably adjustable screen elements to be quickly and automatically extended within the opposing surfaces of such window frame.

With these and other objects in view, the invention will be hereinafter more particularly described with reference to the accompanying drawings, which form a part of this specification.

In the drawings, Figure 1 is a top view, Figure 2 a side view and Figure 3 a transverse, sectional, left-end view on the line, A—A of said Figure 2. Similar letters refer to similar parts throughout these several views.

The device comprises a plurality of members, adjusted with relation to each other as hereinafter particularly explained with relation to the drawings.

The cylindrical member, D, may be of solid construction, although the same preferably should be hollow for saving of weight. The near end of this cylindrical member, D, is telescoped within the opposing end of the hollow cylindrical member, A, against the helical spring, S within said hollow cylindrical member, A. When a hollow cylindrical member, D, is used, said spring, S may extend into the same, as illustrated in Figures 1 and 2. The opposite, further ends, E and F, respectively, of each, said cylindrical members, A and D are drawn and flattened. Thereby a stop is formed for the opposite ends of said spring, S, which is compressed by telescoping said cylindrical member, D, within said hollow cylindrical member, A. A hole, a is provided in said flattened end, E of said cylindrical member, D. A hole, b is likewise provided in said flattened end, F, of said hollow cylindrical member, A. These holes, a and b in the further flattened ends of each said cylindrical members, D and A, respectively, are designed to allow of fastening the same with wood screws, or other suitable means to the opposite sides of an adjustable screen.

Welded, or otherwise secured to the bottom of said cylindrical member, A is the base, B designed to furnish a flat surface for resting upon one of the extensible elements of such screen when the device is applied thereto as described. The strap, C passes underneath and around the sides of said base, B, near the inside end thereof, and the ends of said strap C are welded, or otherwise secured upon the opposite sides of said cylindrical member, A.

A handle, G is welded, or otherwise secured to the top and side surfaces near the inside end of said cylindrical member, A. Near the inside end of said handle, G and at a distance from the line of junction thereof with the top surface of said cylindrical member, A, the bearing pin, I passes through a suitable, transverse hole in said handle, G. The shank of the catch lever, H is provided with a similar hole, where it is pivoted upon said pin, I against said handle, G. The member, J furnishes lateral guidance for the other side of the shank of said catch lever, H when said bearing pin is passed through a corresponding hole in said member, J and the opposite ends of said bearing pin, I are riveted over, or otherwise secured against the outside surfaces of said respective members, G and J, so that the shank of said catch lever is oscillable between them. The top end of the spring, K passes around, and is held in place by a lug on the lower end of the shank of said catch lever, H, as shown in Figure 2; or, the top end of said spring, K may be otherwise secured to the lower end of the shank of said catch lever, H. The bottom end of said spring, K is secured by suitable means upon, or into the top surface of said cylindrical member, A, underneath the shank of said catch lever, H, so that the distensive action of said spring, K normally forces the catch hook, d of said lever, H, into contact along the longitudinal center on the top surface of said cylindrical member, D. Thereupon, when said cylindrical member, D is telescoped into said hollow cylindrical member, A to a sufficient extent, said catch hook, d of said lever, H will engage said hole, h, provided for that purpose, as aforesaid, in the center of the top, near the flattened end, E, of said cylindrical member, D. When the trigger, t of said catch lever, H is compressed against the action of said spring, K, said catch hook, d will be lifted from said hole, h, thus allowing the distensive action of said spring, S to force said cylindrical member, D out of its telescoped position within said hollow cylindrical member A.

A guard, L may be secured by welding, or other means, at its top end to the lower surface of the grip part of the handle, G and at its bottom end to the upper surface of said cylindrical member, A, opposite that side of the spring, K which is nearer the center of the length of said handle, G, for protecting the hand of a person using the device from the action of said spring, K.

From the foregoing description, it will be evident that when this device is secured, at E and F, respectively, to the opposite sides of an adjustable screen comprising several elements, which from a superimposed relation, the one to the other, may be extended within guides to a predetermined relation to each other, a simple, efficient means is afforded for holding these elements of such screen in fixed, collapsed relation, when the catch hook, d engages said hole, h in said cylindrical member, D. Then, after such screen, with this device so applied thereto, is placed in position within a window frame to which such screen and device are suited, by applying pressure upon the trigger, t with a finger of the hand holding the handle, G, the catch hook, d will be released from said hole, h. Thereupon, the action of the spring, S will force the cylindrical member, D out of its telescoped relation within said hollow cylindrical member, A, thus extending the several screen elements within the opposing sides of such window frame.

Having thus described our invention, we claim as new, and desired to secure by Letters Patent the following:

1. An attachment for a window screen including two members slidable, one relatively to the other, said attachment comprising telescopic members, one member for attachment to each screen member, a spring for ejection of one telescopic member beyond the other, a hand-grip attached to one of the telescopic members, a pivoted spring influenced interlocking member mounted on one of the telescopic members and positioned to interlock with and hold the spring projectable telescopic member in retracted position, and a trigger associated with said interlocking member and positioned adjacent to the hand-grip of one of the telescopic members for releasing the interlocking member to permit the ejection spring to eject the projectable telescopic member beyond its companion member.

2. An attachment for a window screen including two members slidable one relatively to the other, said attachment comprising telescopic members, one member for attachment to each screen member, a spring for ejection of one member beyond the other, a pivoted lever mounted on one of the telescopic members and engageable with the other to hold it in retracted position, and means for releasing the lever to permit the spring to eject one of the telescopic members.

3. An attachment for a window screen including two members slidable one relatively to the other, said attachment comprising telescopic members at least one of which is tubular, a spring enclosed in the tubular member and operating to eject the other member from the tubular member, a hand-grip attached to the tubular member, a lever pivotally mounted on the hand-grip and positioned for engagement with the spring projectable member to hold it in retracted position, a spring for pressing the lever against the projectable telescoping member, and a trigger for depressing the lever against its spring to release the lever and permit the ejecting spring to project one telescopic member from the other.

4. An attachment for a window screen including two members slidable one relatively to the other, said attachment comprising telescopic members, one member for attachment to each screen member, one of the telescoping members being tubular, a base plate to which the tubular member is attached, a hand-grip secured to the tubular member, a spring for projecting one of the telescopic members from the other, a lever pivotally mounted on the hand-grip and positioned to engage the projectable telescopic member to hold it at will in retracted position, a spring for holding the lever in position to engage the projectable telescopic member, and means for releasing holding engagement between the lever and projectable telescopic member.

MAX EMIL PODGORSKI.
LOUISE M. SOLDEN.